US012689262B2

(12) United States Patent
Shiraki

(10) Patent No.: US 12,689,262 B2
(45) Date of Patent: Jul. 21, 2026

(54) CORELESS MOTOR

(71) Applicant: CORELESS MOTOR CO., LTD.,
Yamato (JP)

(72) Inventor: Manabu Shiraki, Yamato (JP)

(73) Assignee: CORELESS MOTOR CO., LTD.,
Kanagawa (JP)

( * ) Notice: Subject to any disclaimer, the term of this
patent is extended or adjusted under 35
U.S.C. 154(b) by 138 days.

(21) Appl. No.: 18/484,902

(22) Filed: Oct. 11, 2023

(65) Prior Publication Data

US 2024/0195262 A1 Jun. 13, 2024

Related U.S. Application Data

(63) Continuation of application No. 16/956,090, filed as
application No. PCT/JP2018/047221 on Dec. 21,
2018, now abandoned.

(30) Foreign Application Priority Data

Dec. 22, 2017 (JP) ................................. 2017-246095

(51) Int. Cl.
*H02K 3/47* (2006.01)
*H02K 7/116* (2006.01)
*H02K 16/02* (2006.01)

(52) U.S. Cl.
CPC ............... *H02K 7/116* (2013.01); *H02K 3/47*
(2013.01); *H02K 16/02* (2013.01)

(58) Field of Classification Search
CPC . H02K 3/26; H02K 3/47; H02K 7/116; H02K
16/02
See application file for complete search history.

(56) References Cited

U.S. PATENT DOCUMENTS

2002/0047418 A1 4/2002 Seguchi et al.
2013/0026861 A1* 1/2013 Takeuchi ................. H02K 3/47
310/43

(Continued)

FOREIGN PATENT DOCUMENTS

CN 106385135 A 2/2017
JP S50148792 U 12/1975
(Continued)

OTHER PUBLICATIONS

Shiraki, Machine Translation of WO2019124543, Jun. 2019 (Year:
2019).*

(Continued)

*Primary Examiner* — Eric Johnson
(74) *Attorney, Agent, or Firm* — BUCHANAN
INGERSOLL & ROONEY PC

(57) ABSTRACT

A coreless motor includes a shaft that extends in the axial
direction at the center of the coreless motor and passes
through said coreless motor; a coil is disposed with respect
to the shaft, and has an end surface on one side that is
supported by a stator and extends in the direction in which
the shaft extends; a rotor that is disposed with respect to the
fixed shaft and includes a cylindrical inner yoke and an outer
yoke positioned so that the coil is sandwiched between the
yokes, the yokes being provided with a magnet positioned
on the side of the yoke, a magnet circuit being formed
between the yokes, and the rotor being supported by the
shaft at the radial center; a housing that includes a cylindri-
cal part disposed concentrically with respect to the fixed
shaft on the outside of the outer yoke in the radial direction.

1 Claim, 7 Drawing Sheets

(56)                  References Cited

U.S. PATENT DOCUMENTS

| | | | |
|---|---|---|---|
| 2014/0070651 A1 | 3/2014 | Gerfast | |
| 2014/0368092 A1* | 12/2014 | Shiraki | ................ B60K 7/0007 |
| | | | 310/67 R |
| 2020/0395817 A1 | 12/2020 | Shiraki | |

FOREIGN PATENT DOCUMENTS

| | | | | |
|---|---|---|---|---|
| JP | 1983172358 | U1 | 11/1983 | |
| JP | 2003143805 | A | 5/2003 | |
| JP | 2006103392 | A | 4/2006 | |
| JP | 2009284584 | A | 12/2009 | |
| JP | 2016027786 | A | 2/2016 | |
| JP | 2017186006 | A | 10/2017 | |
| WO | 2015162826 | A1 | 10/2015 | |
| WO | WO-2019124543 | A1 * | 6/2019 | ............. H02K 21/22 |

OTHER PUBLICATIONS

International Search Report (with English Translation) and Written Opinion issued in corresponding International Patent Application No. PCT/JP2018/047221, 9 pages (Mar. 26, 2019).

* cited by examiner

CORELESS MOTOR

CROSS REFERENCE TO RELATED APPLICATIONS

The present application is a continuation of U.S. patent application Ser. No. 16/956,090, filed Jun. 19, 2020, which claims priority to International Application No. PCT/JP2018/047221 filed Dec. 21, 2018, and claims the benefit of Japanese Patent Application No. PCT/JP2018/000425, filed Jan. 11, 2018 and Japanese Patent Application No. 2017-246095, filed Dec. 22, 2017. The entire contents of each of U.S. application Ser. No. 16/956,090, International Application No. PCT/JP2018/047221, Japanese Patent Application No. PCT/JP2018/000425, and Japanese Patent Application No. 2017-246095 are hereby incorporated herein by reference in their entirety.

TECHNICAL FIELD

The present invention relates to a coreless motor. More particularly, it relates to a coreless motor that includes a rotational motion transmission mechanism that is built in the coreless motor for outputting the rotational motion of a rotating part (rotor) installed within the coreless motor and transmitting the same to any exterior devices outside the coreless motor.

DESCRIPTION OF THE PRIOR ART

It has been proposed to provide a motor within which the units such as the speed reduction gear assembly, the brake assembly and the like are mounted on the side of the rotary shaft of the motor on which a particular object to be driven is fixed to said rotary shaft. Said side of the rotary shaft of the motor on which a particular object to be driven is fixed is the output side of said rotary shaft, for example, or the opposite side thereof.

As one example, a motor that includes a planetary roller mechanism that is disposed between the driving shaft and the rotor located concentrically with respect to the driving shaft is discloses in the below described Patent Document 2.

As another example, there is also Patent Document 1 that discloses a speed reduction gear-equipped motor is discloses in the below described Patent Document 1. This speed reduction gear-equipped motor is the core-type motor or the motor based on the core within which the units such as the speed reduction gear assembly and the like are mounted. It includes an armature around the fixed shaft and a cylindrical rotor enclosing the armature and the fixed shaft. Around the rotating part, there is a cylindrical-form outer roller that encloses the rotating part and the fixed shaft and is disposed rotatably with respect to the fixed shaft. It further includes a rotational motion transmission mechanism that is located inside the outer roller and is disposed between the end of the rotating part and the outer roller so that it can transmit the rotational motion of the rotating part that occurs around the center of the fixed shaft to the outer roller. The rotational motion transmission mechanism includes a plurality of center gears through the center of which the fixed shaft is passed and a planetary gear assembly.

The motors disclosed in Patent Documents 1 and 2 are so-called core-type motors. It has been proposed that the units such as the speed reduction gear assembly and the like can be mounted within such core type motor.

On the other hand, with respect to the non-core type motors, that is, the motors which are not based on the cores, any motor within which the units such as the speed reduction gear assembly and the like is mounted has not yet been proposed.

For the coreless motor, it is assumed that this is due to the situation in which most coreless motors generally have been manufactured into the miniature or small-size construction, making it difficult to install the units such as the speed reduction gears and the like within such motors.

The below described Patent Document 3 describes the invention for the coreless motor that was proposed by the inventor of the current patent application. The coreless motor disclosed in Patent Document 3 comprises a central shaft that is extending at the center of radial direction and being the center of rotational motion, and a cylindrical coil that extends in the direction in which the central shaft extends is disposed concentrically with respect to the central shaft. The rotor is disposed concentrically with respect to the central shaft, and includes a cylindrical inner yoke and a cylindrical outer yoke between which the cylindrical coil is sandwiched in the radial direction and between which a magnet circuit is formed.

The coreless motor disclosed in Patent Document 3 is structured such that the central shaft that is being the center of rotational motion passes through the coreless motor. More specifically, the central shaft passes through the cylindrical coil in the direction in which the cylindrical coil is extending. The central shaft also passes through the rotor that includes the cylindrical inner yoke and the cylindrical outer yoke as described above.

The coreless motor having the structure such as that described above has the reduced-size or miniaturized construction as described above, and it has been considered, therefore, that it is difficult to install the units such as the speed reduction gear assembly and the like within the motor. Even for the coreless motor disclosed in the below described Patent Document 3, therefore, the units such as the speed reduction gear assembly is not installed within the motor.

The below described Patent Document 4 describes a wheel-in motor proposed by the inventor of the current patent application. The coreless motor described in Patent Document 4 is structured as described below.

The coreless motor described in Patent Document 4 includes a shaft, a cylindrical coil, a rotor and wheels. The shaft is extending in the axial direction at the center of the coreless motor and passes through the coreless motor. The cylindrical coil is disposed concentrically with respect to the shaft and extending in the direction in which the shaft is extending. The cylindrical coil has an end surface on one side supported by the coil support. The rotor is disposed concentrically with respect to the shaft. The rotor includes a combination of cylindrical inner yoke and cylindrical outer yoke positioned so that the cylindrical coil is sandwiched between those yokes. One of the cylindrical inner yoke or the cylindrical outer yoke has a magnet positioned on the side of one yoke that faces the other yoke. A magnet circuit is formed between the before described cylindrical inner yoke and cylindrical outer yoke. The rotor is rotatably supported by the shaft at the side of center in the radial direction. The wheels secured to the outer yoke and holding the respective tires. The rotation of the outer yoke about the shaft causes the wheels secured to the outer yoke to rotate about the shaft with the tires being held by the wheels.

Even for the coreless motor disclosed in Patent Document 4 as the before described, the units such as the speed reduction gear assembly and the like is not installed within the coreless motor.

It may be understood from the foregoing description, it has never been proposed to install the units such as the speed reduction gear assembly and the like within the coreless motor, that is, the motor that is not based on the core such as the coreless motor described in Patent Documents 3 and 4.

PRIOR TECHNICAL DOCUMENTS

Patent Documents

Patent Document 1: JP, 50-148792, U1(1975)
Patent Document 2: JP-A-2003-143805
Patent Document 3: WO2015/162826
Patent Document 4: JP-A-2017-186006

SUMMARY OF THE INVENTION

The wheel-in motor described in Patent Document 4 is comprised by the coreless motor, that is, the motor that is not based on the core. There is no description in Patent Document 4 with respect to any cylindrical housing which includes cylindrical part located on the outside of outer yoke in the radial direction and disposed concentrically with respect to the shaft and said cylindrical part is being rotating about said shaft. Also, There is no description in Patent Document 4 with respect to any rotational motion transmission mechanism which is disposed inside the before described cylindrical housing and is operated to transmit rotational motion of said rotor rotating about the shaft to the cylindrical housing.

The invention disclosed in Patent Document 4 is intended for making it easier to assemble the wheel-in motor. The invention assumes that the wheels holding the respective tires are secured to the rotor and the rotation of the rotor (outer yoke) causes the wheels to rotate about the shaft (fixed shaft) together with the rotor. Therefore, there is no suggestion in Patent Document 4 suggesting to adopt speed reduction mechanism between rotor (outer yoke) and wheels having tires, thereby decreasing rotation speed of the wheels having tires.

It may be understood from the foregoing description that there is no suggestion suggesting to adopt the structure of the core-based motor as disclosed in Patent Document 1, etc such as the speed reduction gears and the like are installed within said core-based motor into the non-core based motor as disclosed in Patent Document 4.

It is therefore an object of the present invention to provide a coreless motor that includes a rotational motion transmission mechanism mounted therein and operated to deliver the rotational motion of the rotating part (rotor) inside the non-core based coreless motor to any external devices outside the coreless motor.

[1]

A coreless motor which comprises:

a fixed shaft extending in the axial direction at the center of said coreless motor and being passed through said coreless motor;

a cylindrical coil disposed concentrically with respect to said fixed shaft and having an end surface on one side that is supported by a stator and extending in the direction in which said fixed shaft extends;

a rotor disposed concentrically with respect to said fixed shaft and comprising a cylindrical inner yoke and a cylindrical outer yoke positioned so that said cylindrical coil is sandwiched between said cylindrical inner yoke and said cylindrical outer yoke in the radial direction, either said cylindrical inner yoke or said cylindrical outer yoke has a magnet positioned on the side of said cylindrical inner yoke that faces said cylindrical outer yoke or said cylindrical outer yoke that faces said cylindrical inner yoke, a magnet circuit being formed between said cylindrical inner yoke and said cylindrical outer yoke, and said rotor being rotatably supported by said fixed shaft disposed at radial center;

a cylindrical housing that includes a cylindrical part disposed concentrically with respect to said fixed shaft in the outside of said cylindrical outer yoke in the radial direction, said cylindrical part rotating about said fixed shaft: and a rotational motion transmission mechanism disposed in the interior of said cylindrical housing and being operated to transmit the rotational motion of said rotor about said fixed shaft to said cylindrical housing.

[2]

The coreless motor as defined in [1], wherein said rotational motion transmission mechanism comprises a gear mechanism that includes a plurality of gear members, said gear members included in said gear mechanism being rotatably supported by said fixed shaft passing through said gear member located on the side of said fixed shaft in the axial direction.

In accordance with the present invention, a coreless motor that includes the rotational motion transmission mechanism mounted therein and operated to deliver the rotational motion of the rotating part (rotor) inside the non-core based coreless motor to any external devices outside the coreless motor can be provided.

BEST MODE OF EMBODYING THE INVENTION

Embodiment 1

Figure 1:
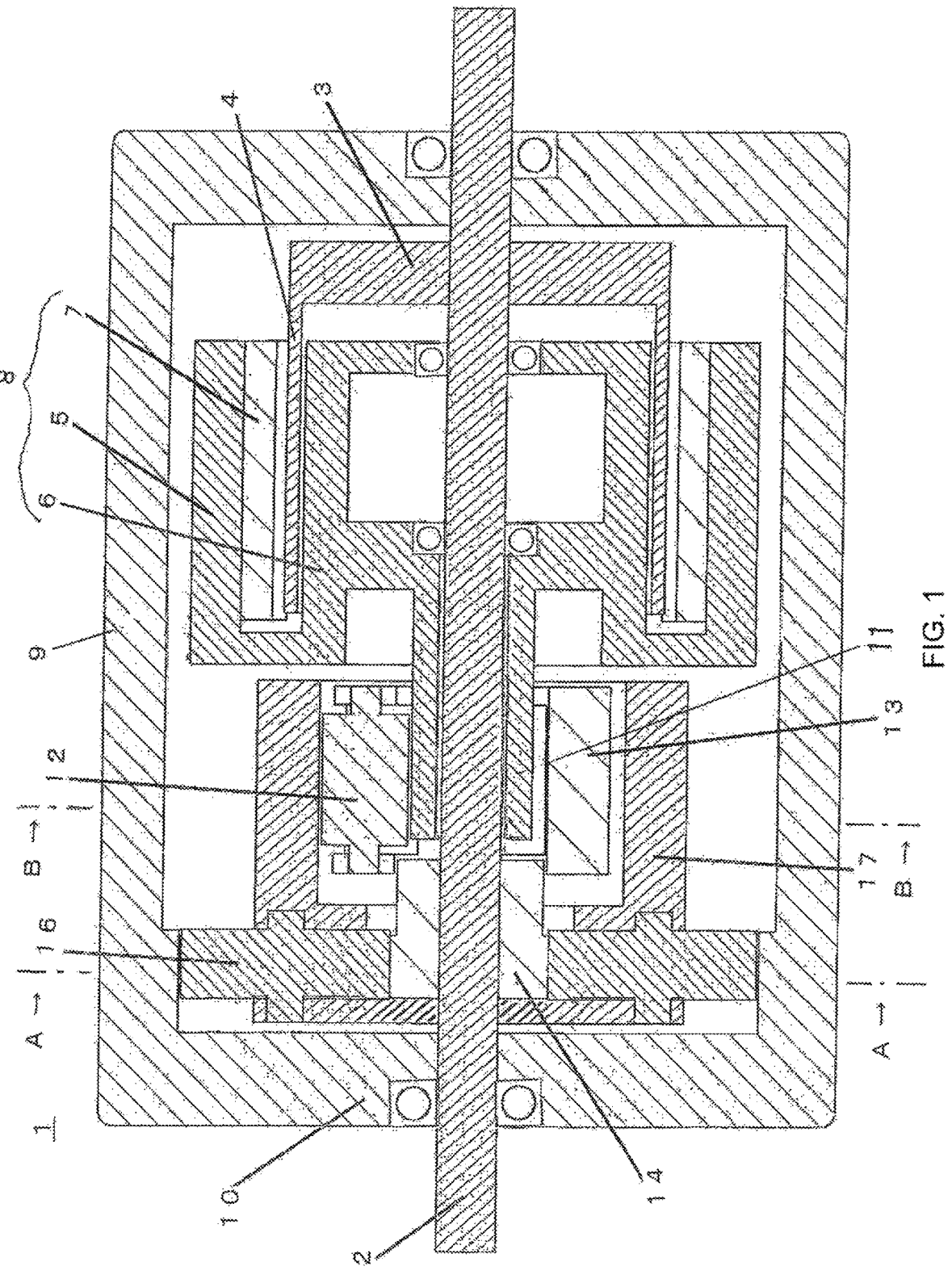
FIG. 1 is a cross-sectional view illustrating the internal structure in accordance with one embodiment of the present invention although some component parts are omitted.

FIG. 1 represents one example of the current embodiment in which the coreless motor includes a rotational motion transmission mechanism installed therein and operated to transmit the rotational motion of the rotating part (rotor) also installed therein to any external devices outside the coreless motor.

The coreless motor 1 shown in FIG. 1 includes a fixed shaft 2, a stator 3, a cylindrical coil 4, a rotor 8, a cylindrical housing 10 and the rotational motion transmission mechanism mentioned above.

The fixed shaft 2 extends in the axial direction at the center of the coreless motor 1 and passes through the coreless motor 1.

The cylindrical coil 4 is disposed concentrically with respect to the fixed shaft 2, and has an end surface on one side that is supported by the stator 3 and extends in the direction in which the fixed shaft 2 extends. The inner side of the stator 3 in the radial direction is fixed to the fixed shaft 2.

The cylindrical coil 4 is the non-core coil through which electric current can flow. In the embodiment shown, it is shown in FIG. 1 that the cylindrical coil 4 has the laminated structure made of the electrically conducting metal sheet and which is formed by overlapping a plurality of wire portions spaced away from each other and separated by the insulating layers in the longitudinal direction or the direction in which the fixed shaft 2 extends. The cylindrical coil is thus formed cylindrically. The cylindrical coil has the thickness in the radial direction that is equal to less than 5 mm and has the predetermined rigidity. The cylindrical coil such as the one described above may be obtained by the manufacturing method described in the Japanese patent 3704044, for example.

The rotor 8 includes the cylindrical inner yoke 6, the cylindrical outer yoke 5 and the magnet 7. The cylindrical inner yoke 6 and the cylindrical outer yoke 5 are disposed concentrically with respect to the fixed shaft 2 and sandwich the cylindrical coil 4 therebetween in the radial direction.

The magnet 7 that is usually made of the permanent magnet is disposed on the side of either of the yokes 6 or 5 that faces the other yoke. In the embodiment shown, the magnet 7 is disposed on the inner circumferential surface of the outer yoke 5 that faces the outer circumferential surface of the inner yoke 6. The doughnut-like magnet field in cross section is thus formed between the outer yoke 5 and the inner yoke 6, from which the magnet circuit is then completed.

The structure in the embodiment shown may be varied to the structure in which the magnet 7 is located on the outer circumferential surface of the inner yoke 6.

The rotor 8 is rotatably supported by the fixed shaft 2 at the center of the radial direction. It is apparent from the embodiment shown that the rotor 8 has the cylindrical portion on the center side of the radial direction and the fixed shaft 2 passes through said cylindrical portion so that said cylindrical portion can be rotatably supported by the fixed shaft 2. Structurally, the rotor 8 is thus supported by the fixed shaft 2 so that it can be rotated about the fixed shaft 2.

The cylindrical housing 10 has a cylindrical part 9 that is located outside the outer yoke 5 in the radial direction and is disposed concentrically with respect to the fixed shaft 2

From the opposite ends of the cylindrical part 9 in the direction in which the fixed shaft 2 extends, the housing support portions by which the cylindrical housing is supported are extending in the radial direction toward the fixed shaft 2. Structurally, the inner side of each of the housing support portions in the radial direction are rotatably supported with respect the fixed shaft 2 by way of the corresponding bearing and the like. In this way, the cylindrical housing 10 and its cylindrical part 9 are supported so that they can rotate about the fixed shaft 2.

The rotational motion transmission mechanism is provided within the cylindrical housing 10 and is operated so that the rotational motion of the rotor 8 that occurs about the fixed shaft 2 can be transmitted to the rotational motion of the cylindrical housing 10 that occurs about the fixed shaft 2. The cylindrical housing 10 can thus rotate about the fixed shaft 2.

As described above, the doughnut-like magnetic field is formed between the inner yoke 6 and the outer yoke 5, from which the predetermined current is supplied so that it can flow through the cylindrical coil 4, thereby causing the rotor 8 to rotate about the fixed shaft 2.

The rotational motion of the rotor 8 that occurs about the fixed shaft 2 is transmitted to the cylindrical part 9 of the cylindrical housing 10 by means of the rotational motion transmission mechanism. Then, the cylindrical housing 10 and its cylindrical part 9 are caused to rotate about the fixed shaft 2 with the rotational motion that is corresponding to the rotational motion of the rotor 8 that occurs about the fixed shaft 2 and as transmitted.

The rotational motion transmission mechanism may comprise a gear mechanism that includes a plurality of gear members. For example, the gear mechanism including the plurality of gear members may take the form of a speed reduction gear assembly. In the embodiment shown in FIG. 1, the speed reduction gear assembly is implemented by the two-stage speed reduction gear mechanism, through which the rotational motion of the rotor 8 that occurs about the fixed shaft 2 is transmitted to the rotational motion of the cylindrical housing 10 and its cylindrical part 9 that occurs about the fixed shaft 2. As the two-stage speed reduction gear mechanism, the planetary gear mechanism that includes a plurality of gear members may be used.

The rotation of the rotor 8 is transmitted to the cylindrical part 9 of the cylindrical housing 10 through the speed reduction gear mechanism, thereby allowing the cylindrical housing 10 and its cylindrical part 9 to rotate in the circumferential direction of the fixed shaft 2.

Figures 2A, 2B:
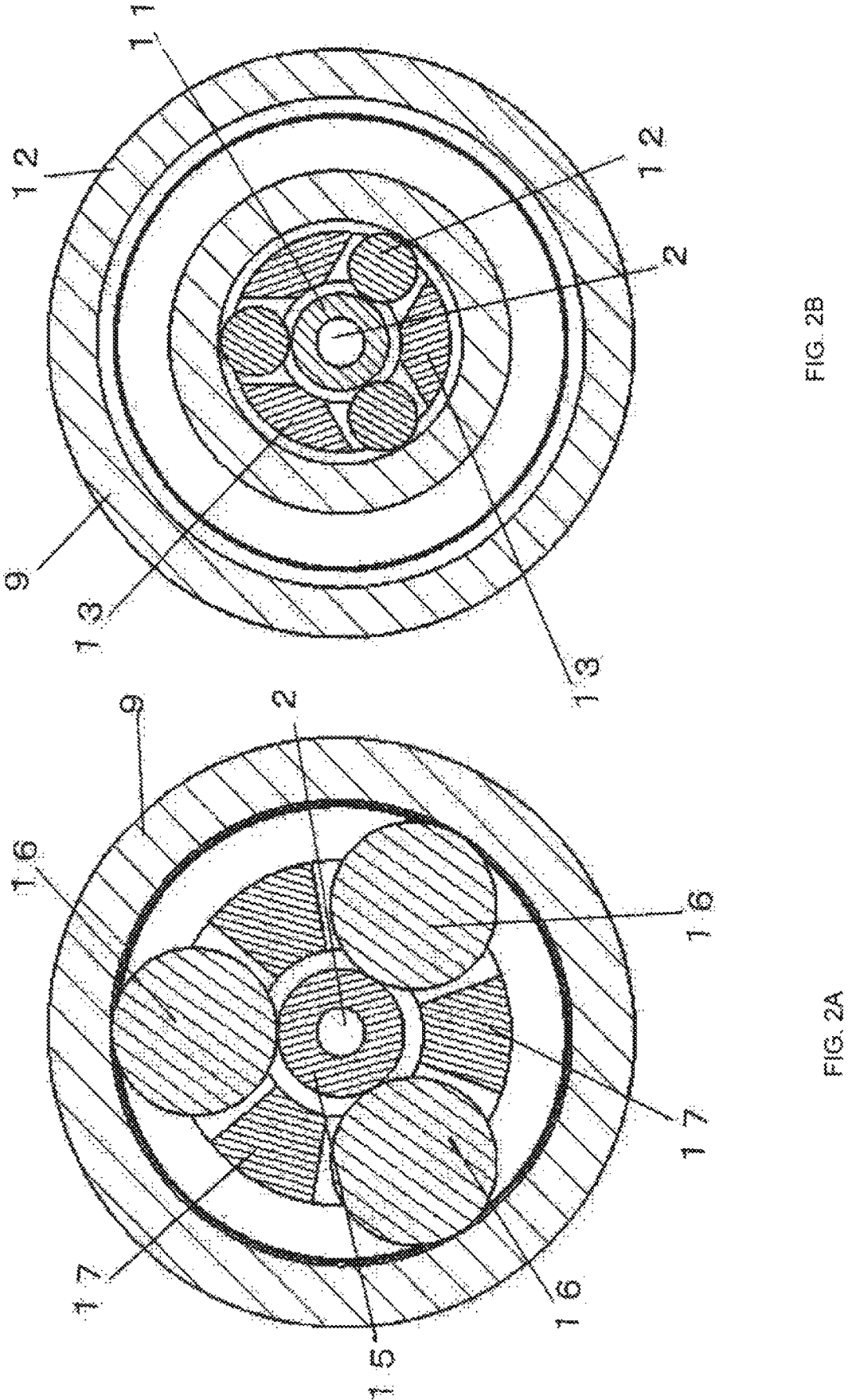
FIG. 2 is a concept diagram illustrating the rotation transmitting portion including the sun gear, the planetary gear and the carrier and showing how those gears and the carrier are arranged in accordance with the embodiment shown in FIG. 1, in which FIG. 2 (*a*) is a cross-sectional view along the line A-A in FIG. 1, and FIG. 2 (*b*) is a cross-sectional view along the line B-B in FIG. 1.

FIG. 2 shows one example of installation embodiment of sun gear, planetary gears and carrier which comprising rotational motion transmission mechanism comprised by planetary gear mechanism disclosed in the embodiment of FIG. 1.

FIG. 2 shows one example of how those gears and carrier are arranged. It is noted that the internal gears and the like that are formed on the inner circumferential surface of the cylindrical part 9 on the cylindrical housing 10 are omitted from FIG. 2. Instead, how the sun gear, planetary gears, carrier, idle gears and the like are arranged or coupled with each other is generally shown.

In the embodiment in FIG. 1, the radial inner side of the rotor 8 is rotatably supported by the fixed shaft 2. And, a high-speed side sun gear 11 is comprised by the outer circumference of said radial inner side of the rotor 8. The rotation of the high-speed side sun gear 11 is transmitted to the low-speed side input shaft 14 through the high-speed side planetary gear 12 and then through the high-speed side carrier 13. The left side outer circumference of the low-speed side input shaft 14 as indicted in FIG. 1 comprises a low-speed side sun gear 15. The rotation of the low-speed side sun gear 15 is transmitted to the cylindrical portions 9 on the cylindrical housing 10 through the low-speed side sun gear 17 and the idle gear (or the high-speed side planetary gear) 16.

Specifically, the rotation is transmitted to the cylindrical part 9 on the cylindrical housing 10 from the high-speed side sun gear 11 formed on the outer circumference of the radial inner side of the rotor 8 rotatably supported by the fixed shaft 2 through the high-speed side planetary gear 12 and the high-speed side carrier 13, then through the low-speed side input shaft 14 and the low-speed side sun gear 15 formed on the left side outer circumference of the low-speed side input shaft 14 and then through the low-speed side carrier 17 and the idle gear (or the low-speed side planetary rear) 16.

In the embodiment in FIG. 1, the high-speed side sun gear 11 is formed on the outer circumference of the radial inner side of the rotor 8. Specifically, the high-speed side sun gear 11 is formed on the outer circumference of the cylindrical part that is provided on the radial inner side of the rotor 8 and is rotatably supported by the fixed shaft 2. Structurally, this ensures that the fixed shaft 2 passes through the high-speed side sun gear 11 so that it can be rotatably supported by the fixed shaft 2.

It is also noted from the embodiment in FIG. 1 that the low-speed side input shaft 14 that receives the rotation of the high-speed side sun gear 11 through the high-speed side planetary gear 12 and the high-speed side carrier 13 takes the cylindrical form through which the fixed shaft 2 passes and which is rotatably supported by the fixed shaft 2.

The low-speed side sun gear 15 is formed on the outer circumference of the left end side of the low-speed side input shaft 14 in FIG. 1. More specifically, the low-speed side sun gear 15 is formed on the left end side outer circumference of the earlier-mentioned cylindrical form in FIG. 1 that forms the low-speed side input shaft 14 and is rotatably supported by the fixed shaft 2.

Structurally, the fixed shaft 2 also passes through the low-speed side sun gear 15. And the low-speed side sun gear 15 is also rotatably supported by the fixed shaft 2.

As its structure has been described above in accordance with the embodiment in FIG. 1, the rotational motion transmission mechanism is implemented by the gear mechanism that consists of the plurality of gear members. And the gears of said gear members located on the side of the fixed shaft 2 in the radial direction are passed through by the fixed shaft 2, so that the gears of said gear members located on the side of the fixed shaft 2 can rotatably supported by the fixed shaft 2.

In the embodiment shown in FIG. 1, it has been described that the rotational motion transmission mechanism is implemented by the gear mechanism that consists of the plurality of gear members. The plurality of gear members may be implemented by the planetary gear mechanism. All of the high-speed side and low-speed side sun gears in the planetary gear mechanism are passed through by the fixed shaft 2 so that they can be rotatably supported by the fixed shaft 2.

It may appear from the above description that the sun gear in the gear mechanism which is located on the side of the fixed shaft 2 in the radial direction of the rotational motion transmission mechanism is passed through by the fixed shaft 2 so that the sun gear can be rotatably supported by the fixed shaft 2.

This permits the rotational motion of the rotor 8 that occurs about the fixed shaft 2 to be transmitted by the rotational transmission mechanism to the cylindrical part 9 of the cylindrical housing 10, thereby allowing the cylindrical housing 10 and its cylindrical part 9 to rotate with the rotational motion that is corresponding to that of the rotor 8 that occurs about the fixed shaft 2 and as transmitted. This avoids any blurs, vibrations or rattles that might be caused when the cylindrical part 9 of the cylindrical housing 10 rotates about the fixed shaft 2.

In the embodiment in FIG. 1, the rotational motion of the rotor 8 that occurs about the fixed shaft 2 is transmitted to the cylindrical part 9 of the cylindrical housing 10 by using the two-stage speed reduction gear mechanism so that it can rotate about the fixed shaft 2 with the rotation that is corresponding to that of the rotor 8 as transmitted.

The two-stage speed reduction gear mechanism may be replaced by the one-stage speed reduction gear mechanism through which the rotational motion of the rotor 8 that occurs about the fixed shaft 2 can also be transmitted to the cylindrical housing 10 and its cylindrical part 9 so that they can rotate about the fixed shaft 2 with the rotation that is corresponding to that of the rotor 8 as transmitted.

Even in the case where the rotational motion of the rotor 8 that occurs about the fixed shaft 2 is transmitted to the cylindrical housing 10 and its cylindrical part 9 by using the one-stage speed reduction gear mechanism, the structure may be such that the rotational motion transmission mechanism is implemented by the gear mechanism that consists of a plurality of gear members (such as the planetary gear mechanism, for example), thereby allowing the fixed shaft 2 passes through the gear located on the side of the fixed shaft 2 in the radial direction (such as the sun gear in the planetary gear mechanism, for example) so that the gear located on the side of the fixed shaft 2 in the radial direction can be rotatably supported by the fixed shaft 2.

In this way, the rotational motion of the rotor 8 that occurs about the fixed shaft 2 can be transmitted to the cylindrical part 9 of the cylindrical housing 10 through the rotational motion transmission mechanism, thereby allowing the cylindrical housing 10 and its cylindrical part 9 to rotate with the rotational motion that is corresponding to that of the rotor 8 that occurs about the fixed shaft 2. This avoids any blurs, vibrations or rattles that might be caused when the cylindrical part 9 of the cylindrical housing 10 rotates about the fixed shaft 2.

It may be understood from the embodiment described above that the coreless motor includes the fixed shaft that is passes through the coreless motor in the axial direction and about which the coreless motor rotates, and the rotor that is installed therein and is caused to rotate about the fixed shaft, whereby the rotation of the rotor that occurs about the fixed shaft is transmitted to the cylindrical part of the housing that is located concentrically with respect to the fixed shaft on the outside of the rotor in the radial direction by means of the rotational motion transmission mechanism that is implemented by the gear mechanism such as the planetary gear mechanism that consists of a plurality of gear members.

The coreless motor is structured such that the fixed shaft 2 passes through the gear in the gear mechanism that is located on the side of the fixed shaft 2 in the radial direction so that said gear is rotatably supported by the fixed shaft 2. As the example of the gear mechanism, it may be implemented by the planetary gear mechanism including the sun gear that is located on the side of the fixed shaft 2 in the radial direction and through which the fixed shaft 2 passes so that the sun gear can be rotatably supported by the fixed shaft 2.

The rotational motion transmission mechanism can thus be installed within the coreless motor without increasing the original size of the coreless motor that has been manufactured into the small size construction and that the rotational motion of the rotor that occurs about the fixed shaft can be transmitted to the cylindrical part located concentrically with respect to the fixed shaft on the outside of the rotor. The fixed shaft of the coreless motor passes through the gear composed in the gear mechanism and is located on the side of the fixed shaft 2 thereby said gear is rotatably supported by the fixed shaft. This avoid any blurs, vibrations or rattles.

Embodiment 2

Figure 3:
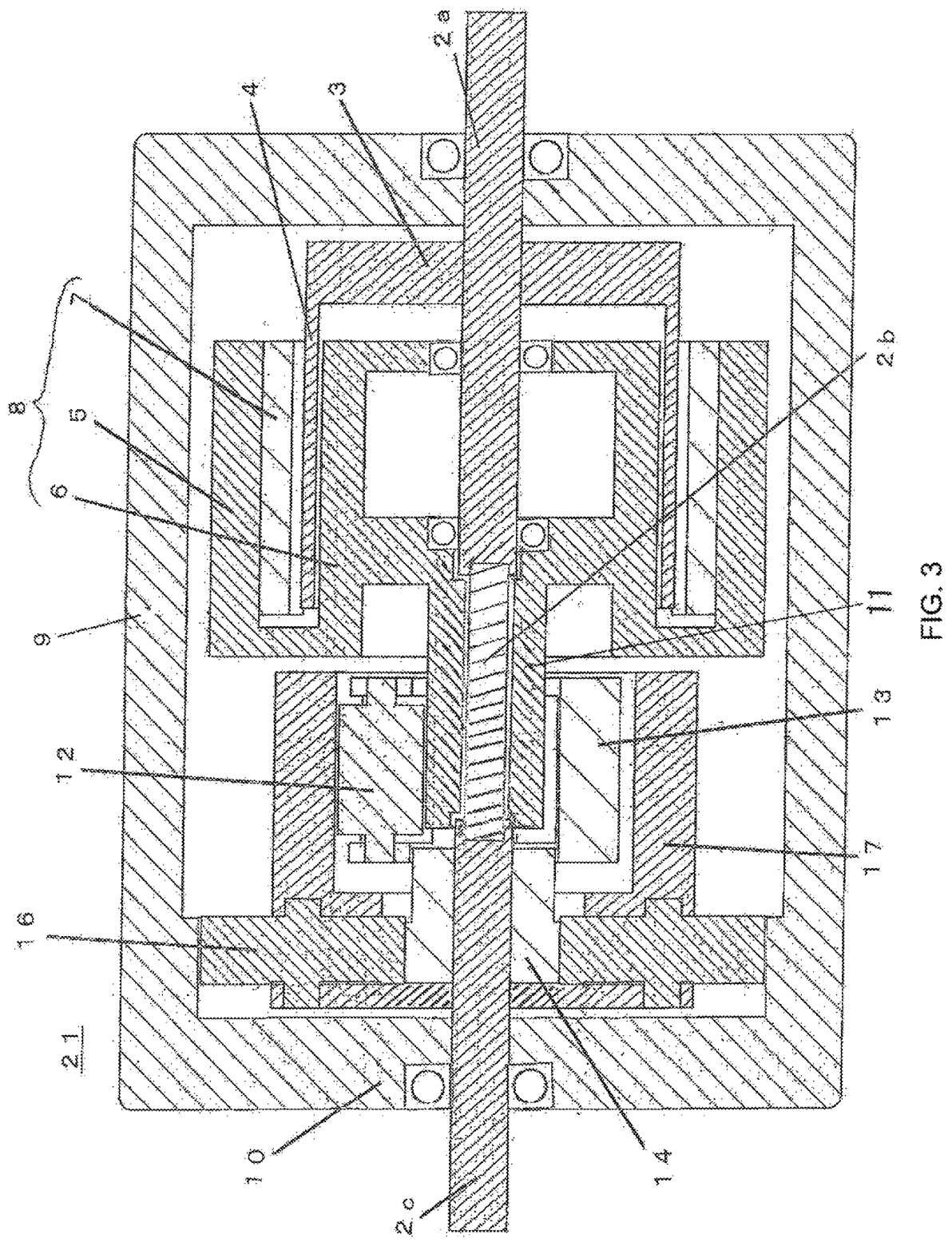
FIG. 3 is a cross-sectional view illustrating the internal structure in accordance with another embodiment of the present invention although some component parts are omitted.

The coreless motor 21 shown in FIG. 3 represents a variation of the coreless motor 1 shown in FIG. 1 in which the fixed shaft 2 in the coreless motor 1 is divided into three bar-like shaft members 2a, 2b and 2c in the direction in which the fixed shaft extends.

In other aspects, the coreless motor 21 is the same as that of the coreless motor 1 in FIG. 1. Those parts or portions which are common to those in FIG. 1 are given like reference numerals and are not described below.

In the embodiment shown, the bar-like shaft member 2b located on the middle way of the fixed shaft has the external diameter that is smaller than those of the bar-like shaft members 2a and 2c. It is also shown that the bar-like shaft member 2a has a fitting hole formed on the side of the bar-like shaft member 2b and the bar-like shaft member 2c has a fitting hole formed on the side of the bar-like shaft member 2b. The bar-like shaft member 2b can be secured to the bar-like shaft members 2a and 2c by fitting the bar-like shaft member 2b into those fitting holes and securing it thereto.

The fixed shaft that is divided into the three parts can be completed into a single fixed shaft by securing the bar-like shaft member 2b to the bar-like shaft member 2a from the direction in which the fixed shaft extends and then by securing the bar-like shaft member 2c to the bar-like shaft member 2b from the direction in which the fixed shaft extends. This makes it easier to install the rotational motion transmission mechanism within the small-size coreless motor in order to permit it to deliver the rotational motion of the rotating part (rotor) to any external devices outside the coreless motor. This makes the assembling operation easier.

Although this is not shown, the bar-like shaft members 2a, 2b and 2c may have the same external diameter, and the bar-like shaft member 2a may have a smaller fitting hole formed on the side of the bar-like shaft member 2b and the bar-like shaft member 2c may have a smaller fitting hole formed on the side of the bar-like shaft member 2b. The central bar-like shaft member 2b may have a small-diameter projecting portion on each of the opposite ends thereof that engages those fitting holes. In this case, the fixed shaft that passes through the coreless motor has the identical diameter over its length as this is the same as the embodiment 1 (FIG. 1). This also makes the assembling operation easier.

In the coreless motor 21 in the embodiment 2, the rotor 8 is rotatably supported by the fixed shaft, and the left end side outer circumference of the radial inner side of the rotor 8 that is extending in the left direction of the radial inner side of the rotor 8 as shown in FIG. 3 serves as the high-speed side sun gear. The fixed shaft may be comprised by securing those three bar-like shaft members to each other from the axial direction, and those members may have the smaller diameter as shown in FIG. 3, in order to allow the high-speed side sun gear of the rotor to be rotatably supported by the fixed shaft. In this case, the high-speed side sun gear may have the diameter that is larger than that of the sun gear in the embodiment 1.

Other Embodiments

Any one of the coreless motors in the respective embodiments shown in FIG. 4 through FIG. 7 includes the following parts or portions like those in the embodiments in FIG. 1 and FIG. 3 described above.

The fixed shaft 2 that extends in the axial direction thereof at the center of the coreless motor 1 and passes through the coreless motor 1.

The cylindrical coil 4 disposed concentrically with respect to the fixed shaft 2 and having an end surface on one side supported by the stator 3 and which extends in the direction in which the fixed shaft 2 extends.

The rotor 8 disposed concentrically with respect to the fixed shaft 2 and rotatably supported by the fixed shaft 2 at the radial center and including a cylindrical inner yoke and a cylindrical outer yoke positioned so that the cylindrical coil 4 is sandwiched between those yokes in the radial direction, either of the yokes being provided with a magnet 7 positioned on the side of one yoke that faces the other yoke and a magnetic circuit being formed between the yokes.

The cylindrical housing 10 having the cylindrical part 9 disposed concentrically with respect to the fixed shaft 2 on the outside of the outer yoke in the radial direction. The cylindrical part 9 of the cylindrical housing 10 can be rotated about the fixed shaft 2.

The rotational motion transmission mechanism disposed inside the cylindrical housing 10 and being capable of transmitting the rotational motion of the rotor 8 that occurs about the fixed shaft 2 to the cylindrical housing 10.

The basic mechanical structure or operation is similar to that in each of the embodiments 1 and 2 shown in FIG. 1 through FIG. 3. Those parts or portions that are common to those in the above embodiments are given like reference numerals and are not described any further.

Figure 4:
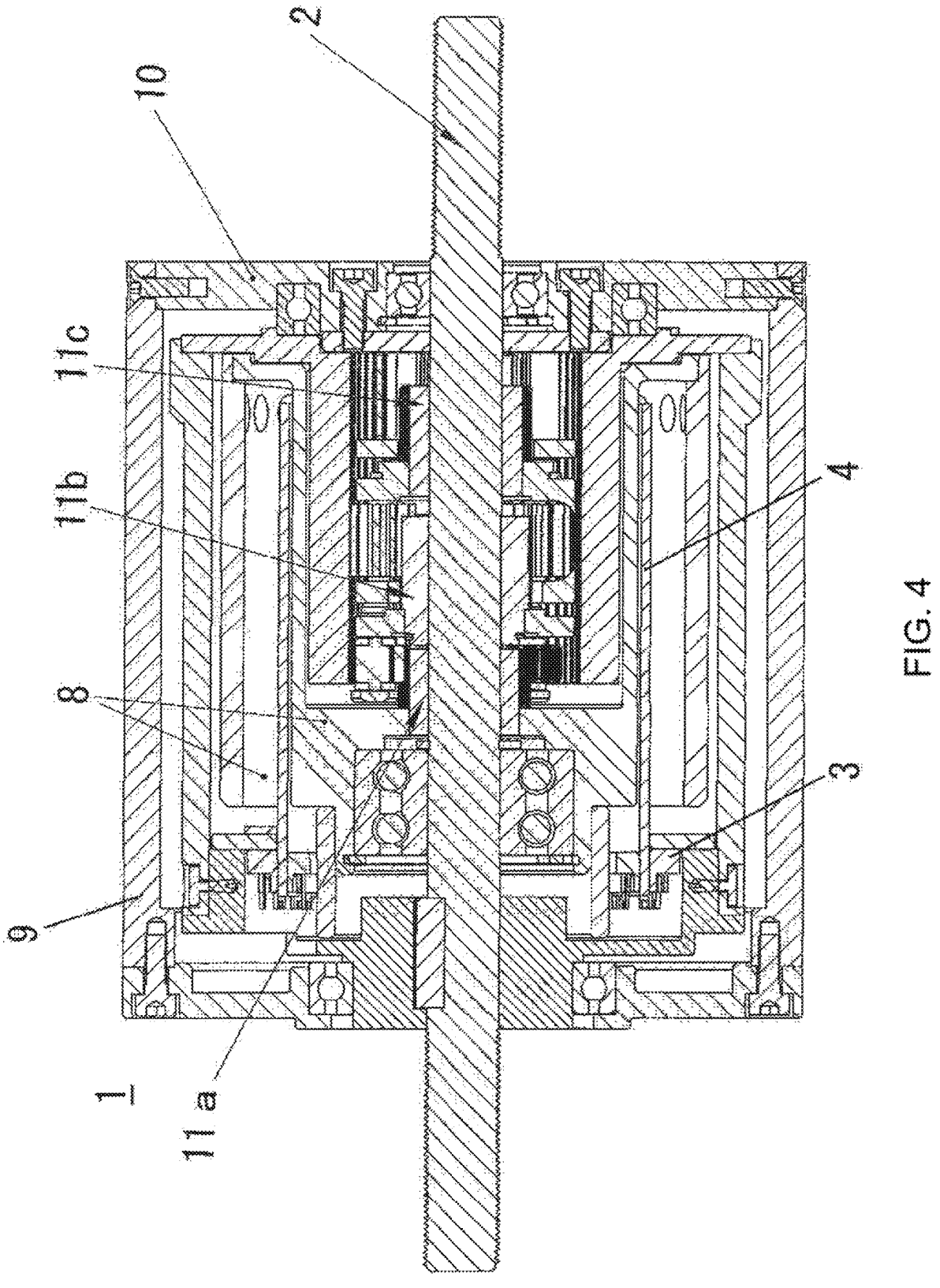
FIG. 4 is a cross-sectional view illustrating the internal structure in accordance with still another embodiment of the present invention although some component parts are omitted.
Figure 5:
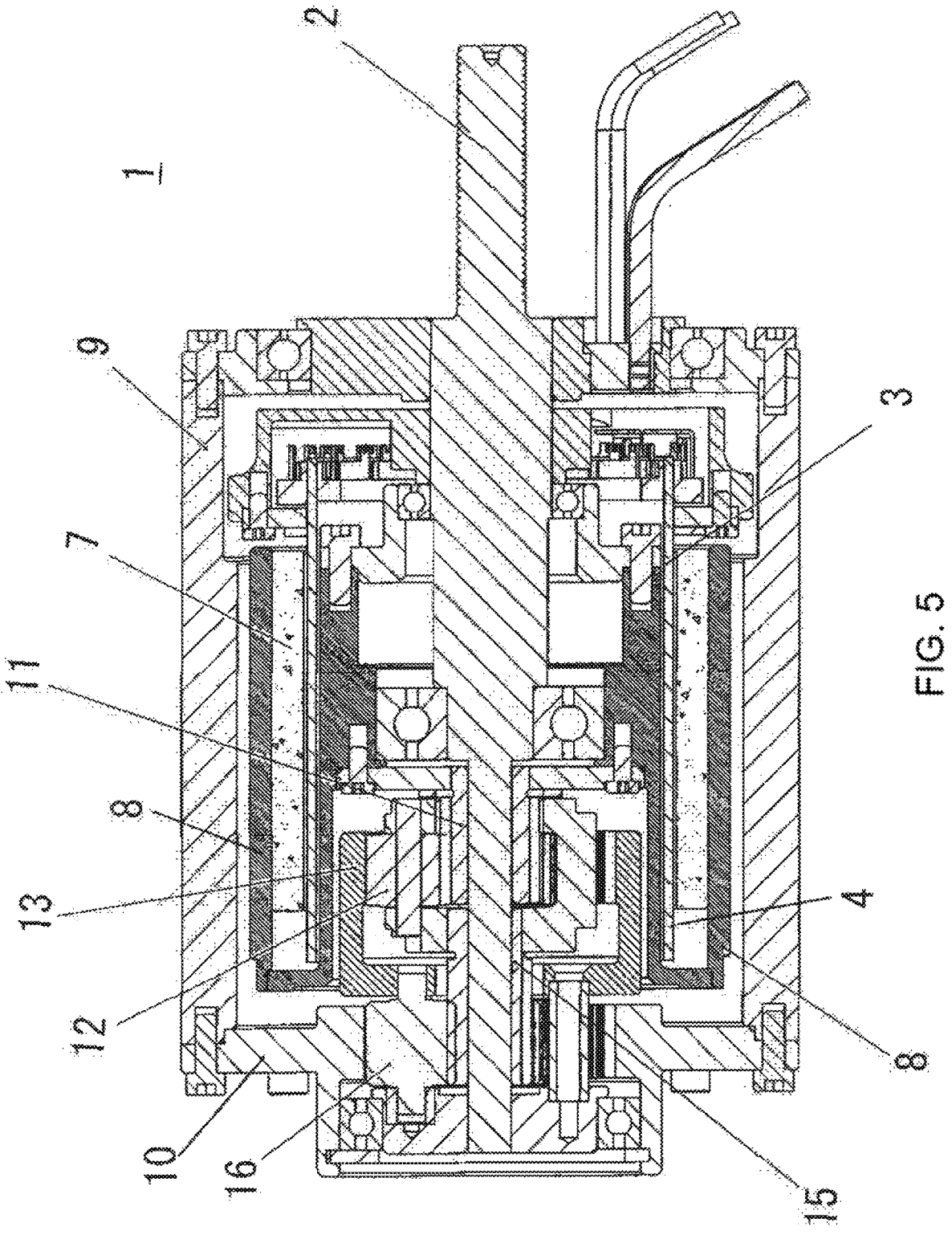
FIG. 5 is a cross-sectional view illustrating the internal structure in accordance with further another embodiment of the present invention although some component parts are omitted.
Figure 6:
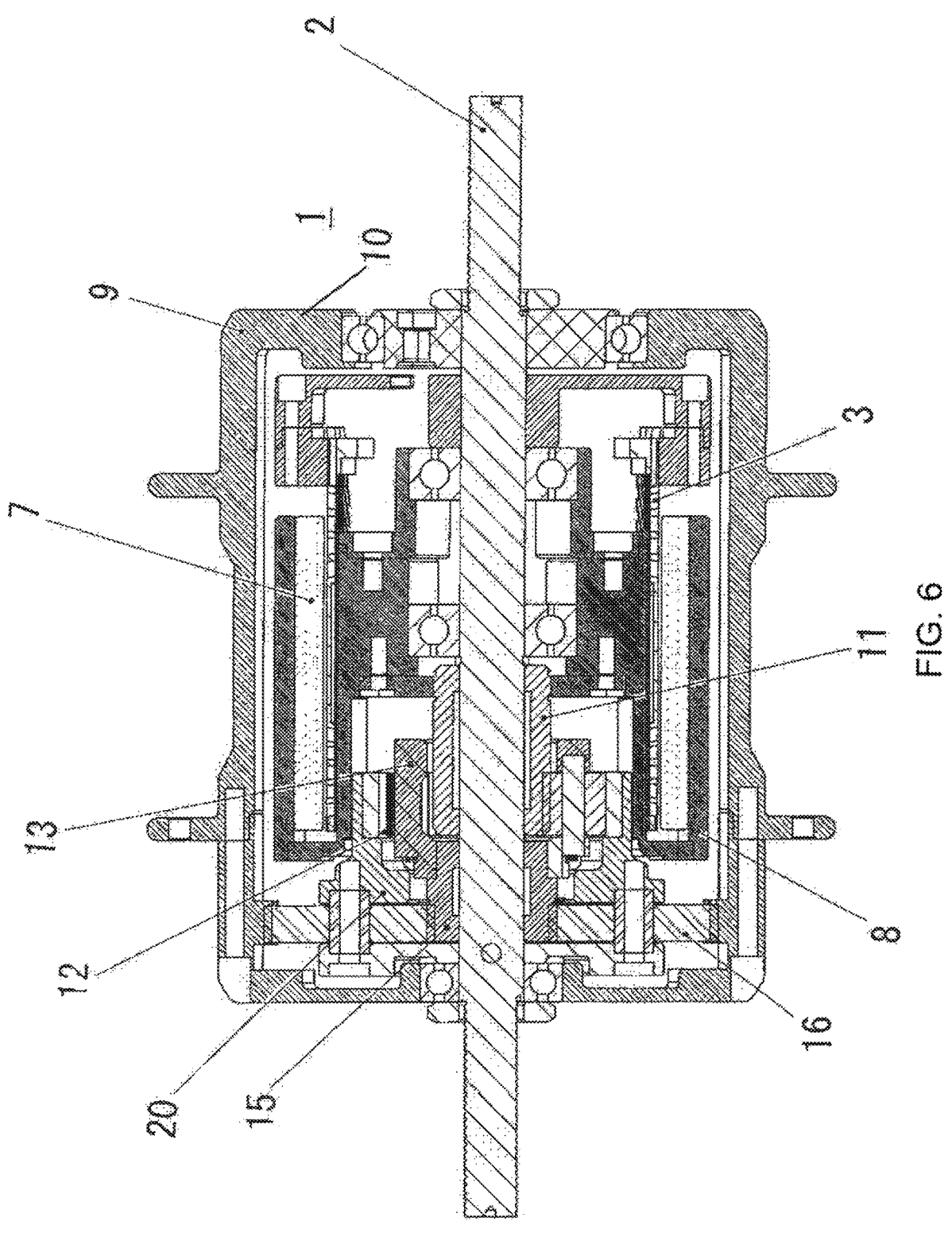
FIG. 6 is a cross-sectional view illustrating the internal structure in accordance with still further embodiment of the present invention although some component parts are omitted.
Figure 7:
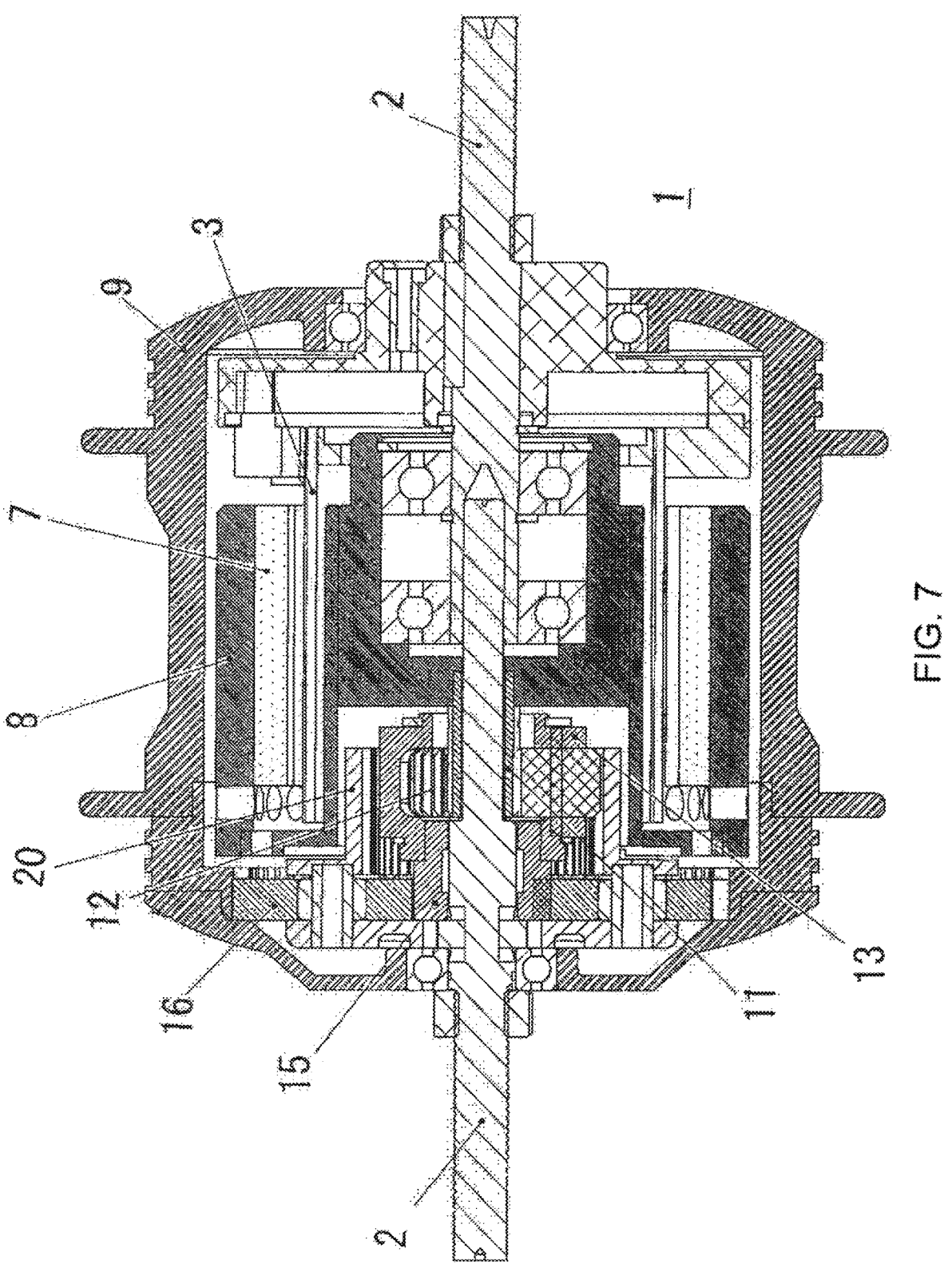
FIG. 7 is a cross-sectional view illustrating the internal structure in accordance with still another embodiment of the present invention although some component parts are omitted.

In the coreless motor shown in FIG. 4, the rotational motion transmission mechanism includes a first stage sun gear 11a, a second stage sun gear 11b and a third stage sun gear 11c, those sun gears being disposed with respect to the fixed shaft 2 so that they can rotate around the fixed shaft 2. The rotational motion of the rotor 8 is transmitted to the cylindrical part 9 through the first stage sun gear 11a, the second stage sun gear 11b, and the third stage sun gear 11c and then through the planetary gear and the carrier disposed around them.

Although the present invention has been described with reference to several embodiments thereof, it should be understood that the present invention is not limited to the before described embodiments and may be varied in various ways without departing from the spirit and scope of the invention as defined in the appended claims.

DESCRIPTION OF REFERENCE NUMERALS

The following is a list of the reference numerals referred to in the specification:

1, 21 coreless motor
2 fixed shaft
2a, 2b, 2c bar-like shaft members
3 stator 4 cylindrical coil
5 outer yoke
6 magnet
7 inner yoke
8 rotor
9 cylindrical part on the cylindrical housing
10 cylindrical housing
11 high-speed side sun gear
12 high-speed side planetary gear
13 high-speed side carrier
14 low-speed side input shaft
15 low-speed side sun gear
16 idle gear (low-speed side planetary gear)
17 low-speed side carrier
20 gear case flange

The invention claimed is:

1. A coreless motor which comprises:

a shaft extending in an axial direction of said motor and being passed through said motor;

a cylindrical coil disposed stationarily and concentrically with respect to said shaft and having an end surface on one side that is supported by a stator and extending in the direction in which said shaft extends;

a rotor disposed concentrically with respect to said shaft and comprising a cylindrical inner yoke and a cylindrical outer yoke positioned so that said cylindrical coil is sandwiched between said cylindrical inner yoke and said cylindrical outer yoke in a radial direction, either said cylindrical inner yoke or said cylindrical outer yoke has a magnet positioned on the side of said cylindrical inner yoke that faces said cylindrical outer yoke or said cylindrical outer yoke that faces said cylindrical inner yoke, a magnet circuit being formed between said cylindrical inner yoke and said cylindrical outer yoke, and said rotor being rotatably supported by said shaft disposed at a radial center;

a cylindrical housing having a cylindrical part located outside said outer yoke in the radial direction and disposed concentrically with respect to said shaft, said cylindrical part can rotate about said shaft; and a rotational motion transmission mechanism located within said cylindrical housing and mounted within said cylindrical coil in the radial direction of said cylindrical coil and being operated to transmit the rotational motion of said rotor about said shaft to said cylindrical housing thereby transmit the rotational motion of said rotor about said shaft to any external devices outside the coreless motor;

said rotational motion transmission mechanism comprises a gear mechanism that includes a plurality of gear members mounted within said cylindrical coil in the radial direction of said cylindrical coil, the plurality of gear members including a high-speed side sun gear, and the high-speed side sun gear being rotatably supported by said shaft which passes through said high-speed side sun gear;

and said shaft extending in an axial direction of said cylindrical housing and rotatably supporting said cylindrical housing.

* * * * *